United States Patent
Hosur et al.

(10) Patent No.: US 10,423,277 B2
(45) Date of Patent: Sep. 24, 2019

(54) INTERFERENCE REDUCTION CIRCUIT FOR TOUCH SYSTEM

(71) Applicant: TEXAS INSTRUMENTS INCORPORATED, Dallas, TX (US)

(72) Inventors: Srinath Hosur, Plano, TX (US); Ashish Khandelwal, Irving, TX (US); Charles M. Branch, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 1 day.

(21) Appl. No.: 15/499,290

(22) Filed: Apr. 27, 2017

(65) Prior Publication Data

US 2018/0188888 A1    Jul. 5, 2018

Related U.S. Application Data

(60) Provisional application No. 62/440,635, filed on Dec. 30, 2016.

(51) Int. Cl.
*G06F 3/044* (2006.01)
*G06F 3/041* (2006.01)

(52) U.S. Cl.
CPC ........... *G06F 3/0418* (2013.01); *G06F 3/044* (2013.01)

(58) Field of Classification Search
CPC .............................. G06F 3/0418; G06F 3/044
USPC ................................................ 345/173
See application file for complete search history.

(56) References Cited

U.S. PATENT DOCUMENTS

| | | | |
|---|---|---|---|
| 3,784,848 A * | 1/1974 | Hamilton, II | H03G 3/3015 307/116 |
| 2005/0189154 A1 | 9/2005 | Perski et al. | |
| 2011/0254802 A1 | 10/2011 | Philipp | |
| 2012/0013565 A1 | 1/2012 | Westhues et al. | |
| 2012/0200524 A1 | 9/2012 | Vallis et al. | |
| 2016/0195990 A1* | 7/2016 | Han | G06F 1/3262 345/173 |
| 2017/0075472 A1* | 3/2017 | Min | G06F 3/0418 |
| 2017/0131838 A1* | 5/2017 | Lu | G06F 3/0412 |

OTHER PUBLICATIONS

International Search Report for PCT/US2017/068975 dated May 31, 2018.

* cited by examiner

*Primary Examiner* — Amit Chatly
(74) *Attorney, Agent, or Firm* — Ebby Abraham; Charles A. Brill; Frank D. Cimino

(57) ABSTRACT

A circuit includes a receiver that includes an input stage to receive a touch signal from a touch system. A noise reduction circuit that samples the touch signal to detect a noise signal in the touch signal. The noise reduction circuit generates a reduction signal based on the noise signal that is fed back to the input stage of the receiver to mitigate noise interference of the noise signal with respect to the touch signal at the receiver.

17 Claims, 4 Drawing Sheets

INTERFERENCE REDUCTION CIRCUIT FOR TOUCH SYSTEM

CROSS-REFERENCE TO RELATED APPLICATION

This application claims the benefit of U.S. Provisional Patent Application 62/440,635 filed on 30 Dec. 2016, and entitled INTERFERENCE REDUCTION CIRCUIT FOR TOUCH SYSTEM, the entirety of which is incorporated by reference herein.

TECHNICAL FIELD

This relates generally to integrated circuits, and more particularly to a circuit to mitigate noise interference for a touch system.

BACKGROUND

A touch system includes interfaces such as touch screens that can include an input device and output device layered on top of an electronic visual display of an information processing system. For example, a user can provide input or control the information processing system through simple or multi-touch gestures by touching the screen with a special stylus and/or one or more fingers. Touch screens are common in devices, such as game consoles, personal computers, tablet computers, electronic voting machines, and smart phones. These interfaces can also be attached to computers or, as terminals, to networks.

To detect user gestures such as touching via the touch system interface, common technologies include resistive touch screens and capacitive touch screens can be employed. An example capacitive touch screen panel consists of an insulator such as glass, coated with a transparent conductor such as indium tin oxide. As the human body is also an electrical conductor, touching the surface of the screen results in a distortion of the screen's electrostatic field, measurable as a change in capacitance. Different technologies may be used to determine the location of the touch. In some touch systems, mutual or self capacitance can be measured by transmitting a signal on a row/column of the touch screen interface and receiving the signal on a respective column/row. When the touch occurs close to a row/column intersection, the received change in signal strength and/or signal phase changes. This change isolates the touch location.

SUMMARY

In described examples, a circuit includes a receiver that includes an input stage to receive a touch signal from a touch system. A noise reduction circuit that samples the touch signal to detect a noise signal in the touch signal. The noise reduction circuit generates a reduction signal based on the noise signal that is fed back to the input stage of the receiver to mitigate noise interference of the noise signal with respect to the touch signal at the receiver.

In another example, an integrated circuit includes a receiver that includes an input stage to receive a touch signal from a touch system. A noise reduction circuit samples the touch signal to detect a noise signal in the touch signal. The noise reduction circuit generates a reduction signal based on the noise signal that is fed back to the input stage of the receiver to mitigate the noise signal. A control circuit measures the noise signal and provides output controls to the noise reduction circuit based on the measured noise signal to adjust the noise interference of the noise signal with respect to the touch signal.

In yet another example, a method includes: receiving a touch signal via a touch interface at a receiver; sampling energy of a noise signal that interferes with the touch signal; adjusting a reduction signal based on the energy of the noise signal; and applying the reduction signal to an input of the receiver to mitigate noise signal interference with the touch signal at the receiver.

DETAILED DESCRIPTION

Figure 1:
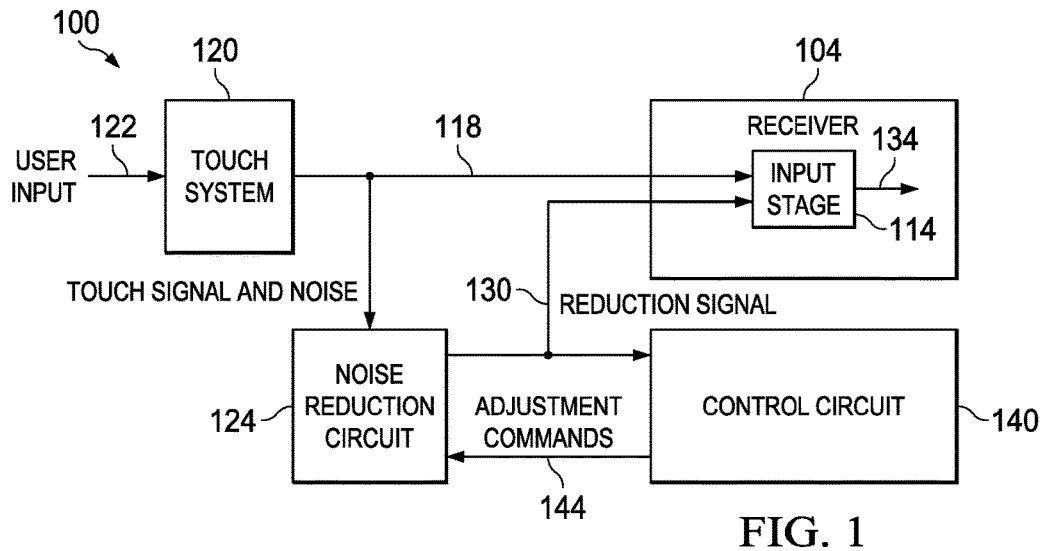
FIG. 1 is a schematic block diagram of an example circuit to mitigate noise interference for a touch system.

In a touch system of example embodiments, an excitation signal is transmitted, coupled through a touch panel (e.g., having mutual capacitance locations) and then received by a receiver. The change in the gain/phase of the received signal indicates the presence or absence of a touch. In an example system such as those used in a mobile device, the received signal also may have an interference signal added to the signal which limits the linearity and the dynamic range of the receive chain. The circuits described herein mitigate the amount of the interference signal at the receiver. In one example, the circuit includes a receiver that includes an input stage (e.g., input amplifier) to receive a touch signal from the touch system.

A noise reduction circuit samples the touch signal to detect a noise signal in the touch signal. The noise reduction circuit can include a high pass filter to isolate the noise signal in a desired frequency band, a gain circuit coupled to the high pass filter to increase or decrease the amplitude of the noise signal, and a delay circuit coupled to the gain circuit to adjust the phase of the noise signal with respect to the touch signal. Each of the circuits in the noise reduction circuit can be individually or collectively controlled to mitigate the noise signal. The noise reduction circuit generates a reduction signal (e.g., signal that offset or reduces the noise signal) based on the noise signal that is fed back to the input stage of the receiver to mitigate the noise signal. A control circuit measures the noise signal and provides output controls to the noise reduction circuit based on the measured noise signal to adjust the noise interference of the noise signal with respect to the touch signal.

The receiver can include an amplifier (or amplifiers) as the input stage. The received signal of interest from the touch system can be low/band passed (e.g., as part of the amplifier) and passed on for further down-stream processing in the receiver. The interference frequency can be either above or below the desired signal frequency. The circuits described herein can operate on signals where the interference frequency is within the desired signal frequency band from the touch system. For example, the noise reduction circuit limits the dynamic range of the receiver amplifier and the down-stream receiver chain. The output from the input amplifier stage can be processed to extract the interference frequency, phase and gain. An anti-interference signal can be generated in digital (or analog) where further gain adjustment can be added to the input of the amplifier stage. The gain and delay and number of interference frequencies for interference cancellation can be controlled based on metrics, such as minimizing the energy after subtraction or maximizing the signal to interference plus noise ratio after the subtraction. For example, the gain, phase and interference detection can be determined during a calibration phase between or before the actual touch detection and applied during the touch detection phase.

FIG. 1 illustrates an example circuit 100 to mitigate noise interference for a touch system. As used herein, the term "circuit" can include a collection of active and/or passive elements that perform a circuit function, such as an analog circuit or control circuit. Additionally or alternatively, for example, the term "circuit" can include an integrated circuit (IC) where all and/or some of the circuit elements are fabricated on a common substrate (e.g., semiconductor substrate).

In the example of FIG. 1, the circuit 100 includes a receiver 110 that includes an input stage 114 to receive a touch signal 118 from a touch system 120. As used herein, the term "touch system" includes any type of system or interface where a user's touch or gesture can be detected. For example, such touch systems can include resistive-based (e.g., change of resistance detects touch) or capacitive touch systems (e.g., change in electro static forces across a capacitor detects touch). The touch system 120 responds to user input touching at 122 to generate the touch signal. As described hereinbelow with reference to FIG. 3, the touch system 120 can receive an excitation signal from a transmitter (not shown) to generate the touch signal 118. A noise reduction circuit 124 samples the touch signal 118 to detect a noise signal that may interfere and may exist in the touch signal. The noise reduction circuit 124 can generate a reduction signal 130 based on the noise signal that is fed back to the input stage 114 of the receiver 110 to mitigate noise interference of the noise signal with respect to the touch signal 118 at the receiver. As used herein, the term "reduction signal" refers to any signal that is fed back to the receiver 110 that reduces the noise signal in the touch signal 118.

In an example, the input stage 114 can be an amplifier (or amplifiers) that amplifies the touch signal 118 at one input of the amplifier and receives the reduction signal 130 at another input of the amplifier to mitigate the noise interference of the noise signal with respect to the touch signal. The amplifier can include at least one feedback path to control the touch signal 118 and the noise signal. For example, the feedback path can include at least one of a resistor feedback path and a capacitor feedback path. Output 134 from the input stage 114 can be passed to one or more downstream stages in the receiver 110 for other processing.

A control circuit 140 determines the magnitude and/or phase of the noise signal and provides adjustment commands 144 to the noise reduction circuit 124 to mitigate the noise interference of the noise signal with respect to the touch signal 118. The noise reduction circuit 124 can include at least one of a high pass filter to isolate the noise signal in a desired frequency band and a gain circuit coupled to the high pass filter to increase or decrease the amplitude of the noise signal. A delay circuit coupled to the gain circuit in the noise reduction circuit 124 can be provided to adjust the phase of the noise signal with respect to the touch signal.

The control circuit 140 provides the adjustment commands (e.g., analog or digital control values) to adjust at least one of the high pass filter, the gain circuit, and the delay circuit to mitigate the noise interference of the noise signal with respect to the touch signal 118. For example, the control circuit 140 can include at least one of a low pass filter coupled to an envelope detector and coupled to a control gain circuit to provide measurements from at least one of the touch signal 118, an output from the delay circuit (which is the reduction signal 130 in this example), and the output 134 from the input stage 114. The measurements can control an amount of signal adjustment in the adjustment commands 144 from the control circuit 140.

For example, the envelope detector in the control circuit 140 can include a series diode to rectify the touch signal 118, the output from the delay circuit, and the output from the input stage 114. Output from the series diode can be coupled to at least one resistor and capacitor to provide filtering of the touch signal 118, the output from the delay circuit, and/or the output 134 from the input stage 114. As described hereinbelow with reference to FIG. 4, a summing stage can be provided before the input stage 114 to receive at least one other signal in addition to the touch signal 118 which is applied to the input stage via the summing stage to mitigate noise interference of the noise signal with respect to the touch signal at the receiver 110.

Figure 2:
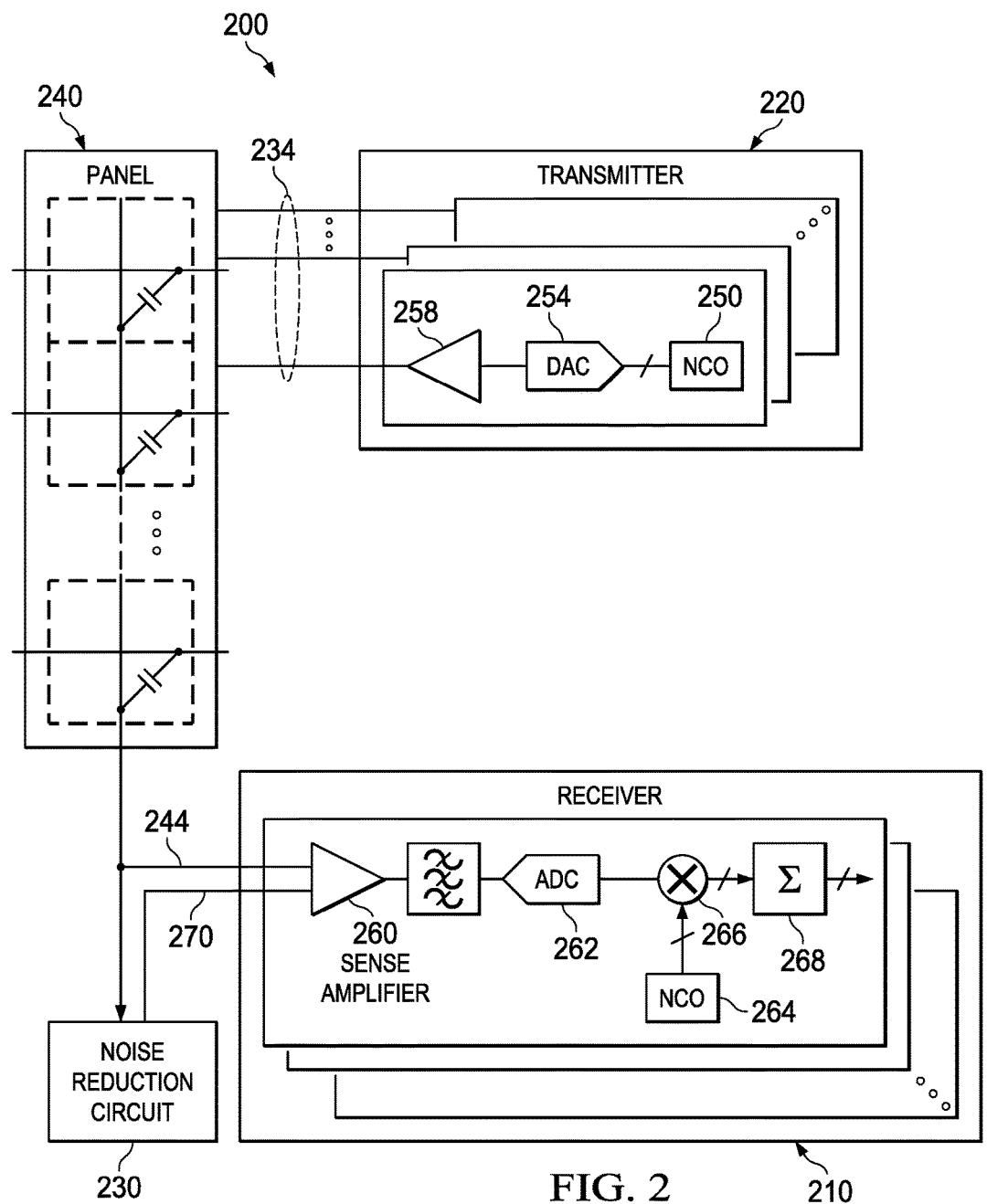
FIG. 2 is a circuit diagram of a receiver and transmitter for an example touch system where a noise reduction circuit is employed to mitigate noise in the receiver.

FIG. 2 illustrates an example circuit 200 of a receiver 210 and a transmitter 220 for a touch system where a noise reduction circuit 230 is employed to mitigate noise in the receiver. The transmitter 220 provides an excitation signal 234 to a touch panel 240. The transmitter 220 provides row and column excitation to the touch panel 240 to detect a user's touch. In this example, a capacitance touch panel 240 is illustrated. In a touch system, mutual or self capacitance can be measured by transmitting the excitation signal 234 to a selected row/column of the panel 240. The receiver receives a signal 244 in response to the signal 234 applied on the column/row of the touch panel 240. When a touch occurs close to a row/column intersection, the received change in signal strength and/or phase change can be detected by the receiver 210. This change isolates the touch location on the touch panel 240.

The transmitter 220 can include at least one numerically controlled oscillator (NCO) 250 which drives a digital to analog converter (DAC) 254, which in turn drives an output amplifier 258 to provide the signal 234. The receiver can include an input stage or amplifier 260 which drives an analog to digital converter (ADC) 262. Output from the ADC can be multiplied via and NCO 264 at 266 which is then summed at 268. As shown, the noise reduction circuit 230 can monitor the output signal 244 from the touch panel 240 to generate a reduction signal 270 to mitigate noise at an input of the amplifier 260. As described hereinbelow with reference to FIG. 4, a control circuit can be provided to control the noise reduction capabilities of the noise reduction circuit 240.

Figure 3:
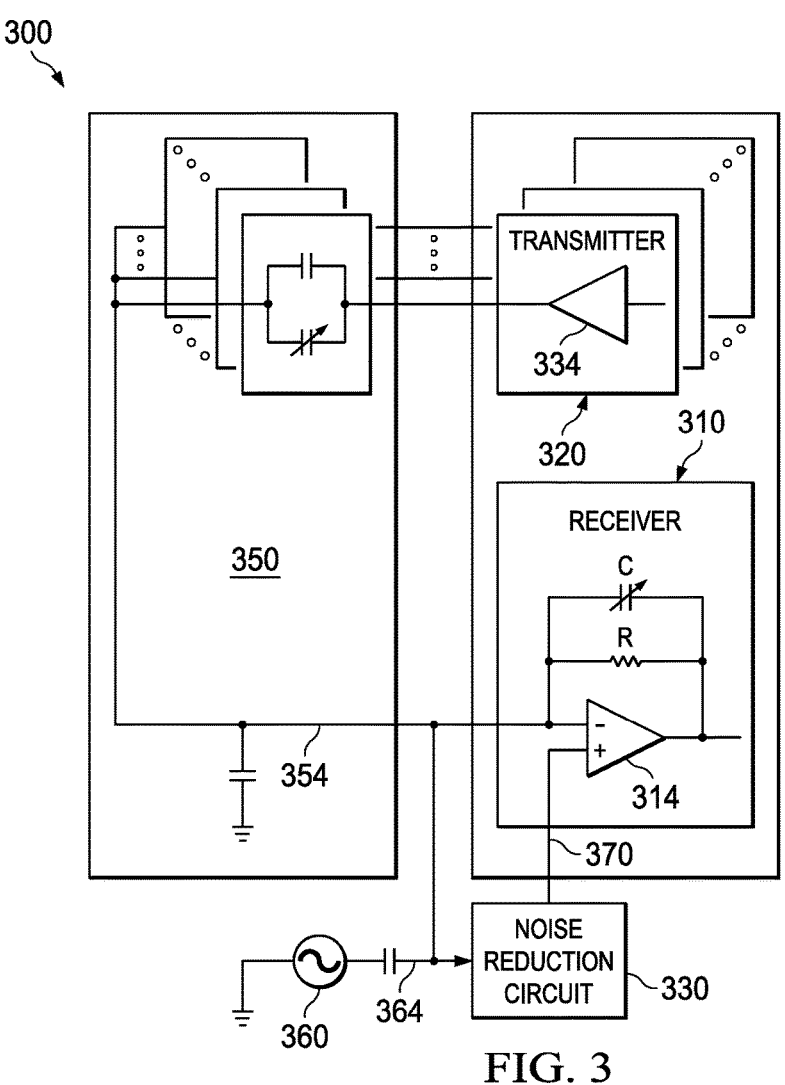
FIG. 3 is a circuit diagram of a receiver having an amplifier stage and transmitter for an example touch system where a noise reduction circuit is employed to mitigate noise at the amplifier stage.

FIG. 3 illustrates an example of a circuit 300 that includes receiver 310 having an amplifier stage 314 and a transmitter 320 for a touch system where a noise reduction circuit 330 is employed to mitigate noise at the amplifier stage. For simplification, the transmitter 320 shows a signal amplifier 334 which provides an excitation signal 340 to a touch panel 350. Output 354 from the touch panel 350 is provided to an inverting input of the amplifier 314. A noise source 360 injects a noise signal 364 on to the output 354 which is monitored via the noise reduction circuit 330 and applied as a noise reduction signal 370 to a non-inverting input of the amplifier 314 to reduce the noise signal 364. As described hereinabove, a control circuit can further control the noise reduction circuit, as described hereinbelow with reference to FIG. 4. As shown, the amplifier 314 can include one or more feedback paths such as a resistive feedback path denoted by R and/or an adjustable capacitive feedback denoted by C.

The received signal at 354 can be affected by interference caused by the noise signal 364. This interference may couple at the input of the receiver 310 through a separate path and can be a strong single frequency with some harmonic content (e.g., due to some clock or power supply noise). The interference signal 364 can be stronger than the signal 354 leading to front end (FE) dynamic range compression at the receiver 210. The noise reduction circuit 330 can estimate and substantially cancel the strongest interference signal 364 before the amplifier 314 (or after the sense amplifier in another downstream stage).

Figure 4:
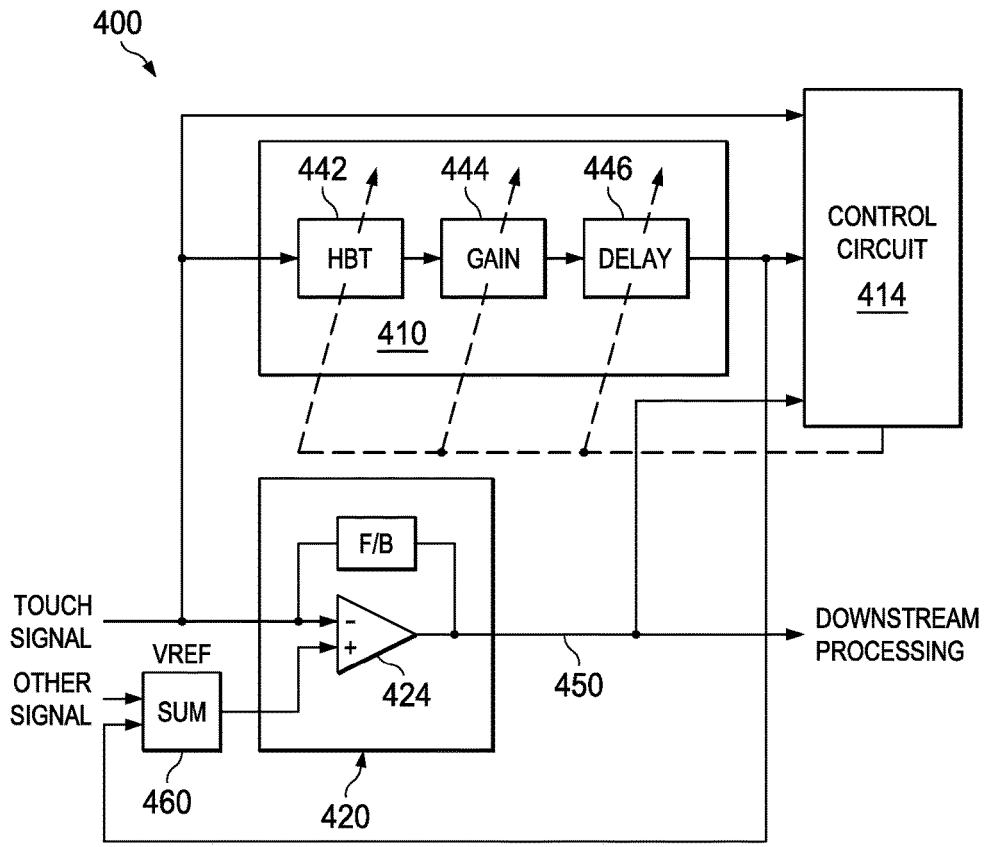
FIG. 4 is a circuit diagram of an example circuit having a noise reduction circuit and control circuit to mitigate noise interference for a touch system.

FIG. 4 illustrates an example circuit 400 having a noise reduction circuit 410 and control circuit 414 to mitigate noise interference for a touch system. The circuit 400 includes a receiver 420 having an input stage 424 to receive a touch signal (shown as TOUCH SIGNAL) from a touch system (not shown). The noise reduction circuit 410 samples the touch signal to detect a noise signal in the touch signal. The noise reduction circuit 410 generates a reduction signal 430 based on the noise signal that is fed back to the input stage 424 of the receiver 420 to mitigate the noise signal. The control circuit 414 measures the noise signal and provides output controls 440 to the noise reduction circuit 410 based on the measured noise signal to adjust the noise interference of the noise signal with respect to the touch signal.

The noise reduction circuit 410 can include at least one of a high pass filter 442 to isolate the noise signal in a desired frequency band. A gain circuit 444 (e.g., amplifier) can be coupled to the high pass filter 442 to increase or decrease the amplitude of the noise signal. A delay circuit (e.g., RC filter) 446 coupled to the gain circuit 444 can adjust the phase of the noise signal with respect to the touch signal.

The control circuit 414 provides adjustment commands to adjust at least one of the high pass filter, the gain circuit, and the delay circuit via the output controls 440 to mitigate the noise interference of the noise signal with respect to the touch signal. For example, adjustment commands can include commands to increase a resistor or capacitor value in the respective filter 442, gain, 444, and delay 446.

As described hereinbelow with reference FIGS. 5 and 6, the control circuit 414 can include at least one of a low pass filter coupled to an envelope detector and coupled to a control gain circuit to provide measurements from at least one of the touch signal, an output from the delay circuit, and an output 450 from the input stage 424. The measurements control an amount of signal adjustment in the adjustment commands from the control circuit 414 to the reduction circuit 410. The input stage 424 can be an amplifier that amplifies the touch signal at one input of the amplifier and receives the reduction signal 430 at another input of the amplifier to mitigate the noise interference of the noise signal with respect to the touch signal. In this example, a summing stage 460 can be provided before the input stage 424 to receive at least one other signal (shown as OTHER SIGNAL) in addition to the touch signal which is applied to the input stage via the summing stage to mitigate noise interference of the noise signal with respect to the touch signal at the receiver.

Figure 5:
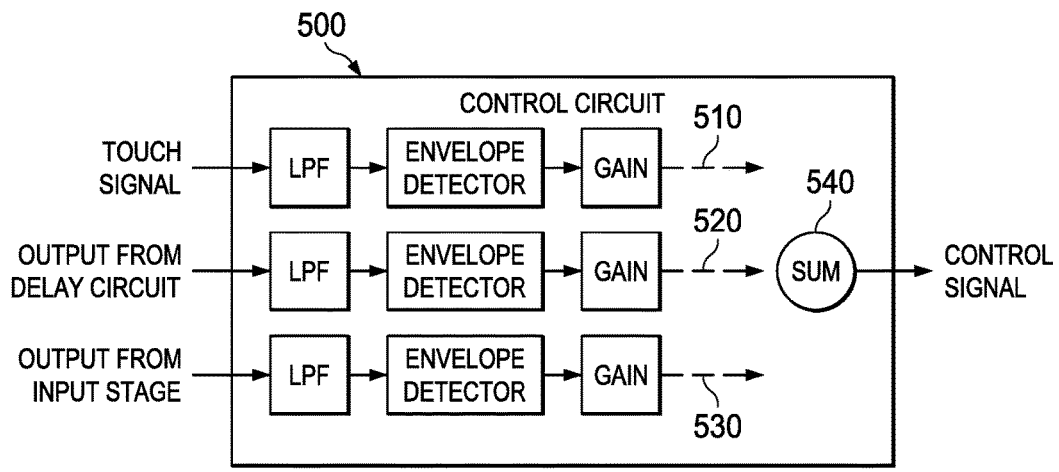
FIG. 5 is a circuit diagram of an example control circuit to mitigate noise interference for a touch system.

FIG. 5 illustrates an example control circuit 500 to mitigate noise interference for a touch system. The control circuit 500 monitors each of the touch signal, the delay output signal, and the output signal from the input stage. Each of the signals can be monitored by a respective low pass filter (LPF), envelope detector and gain circuit to provide output controls shown at 510, 520, and 530 respectively. Each of the output controls can be provided individually to the noise reduction circuits described herein or can be summed via summing circuit 540 to provide a collective control signal to the noise reduction circuit. An example of an envelope detector is described hereinbelow with reference to FIG. 6.

Figure 6:
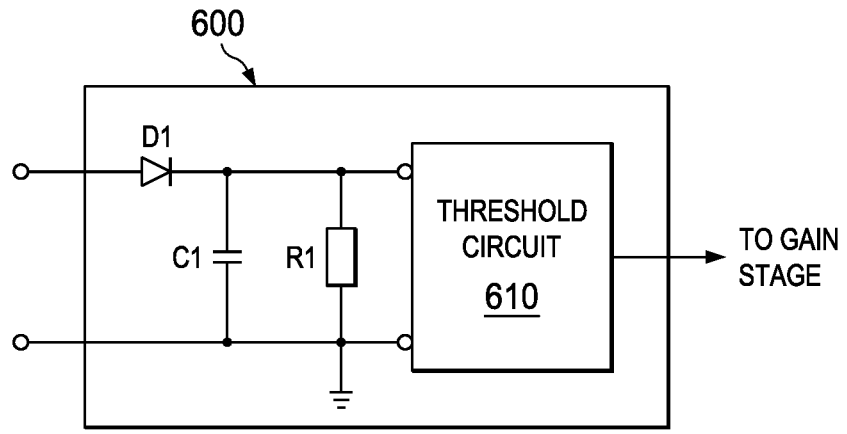
FIG. 6 is a circuit diagram of an example envelope detector to mitigate noise interference for a touch system.

FIG. 6 illustrates an example envelope detector 600 to mitigate noise interference for a touch system. Although a specific example is illustrated, other types of detectors may be employed. For example, output from the low pass filter described herein could be digitized to provide a digital adjustment command to the respective control gain stage of the control circuit such as shown in FIG. 5. As shown, the envelope detector 600 can include a series diode D1 to rectify the touch signal, the output from the delay circuit, or the output from the input stage. The series diode D1 can be coupled to at least one resistor R1 and capacitor C1 to provide filtering of the touch signal, the output from the delay circuit, or the output from the input stage. A threshold circuit 620 (e.g., window comparator) can be provided to monitor the magnitude of the filtered signals from the respective low pass filters in the control circuit. If the monitored signal is within the threshold range provided by the threshold circuit 620, then current output controls from the control circuit can be maintained. For example, if the monitored signal falls outside of the threshold range, then an adjustment (e.g., increase or decrease amplifier gain) can be made via the respective control gain stage of the control circuit.

In view of the structural and functional features described hereinabove, an example method is described with reference to FIG. 7. For clarity, the method is shown and described as executing serially, but parts of the method could occur in different orders and/or concurrently from that shown and described herein. Such method can be executed by various components, such as components configured in an integrated circuit, a processor or a controller.

Figure 7:
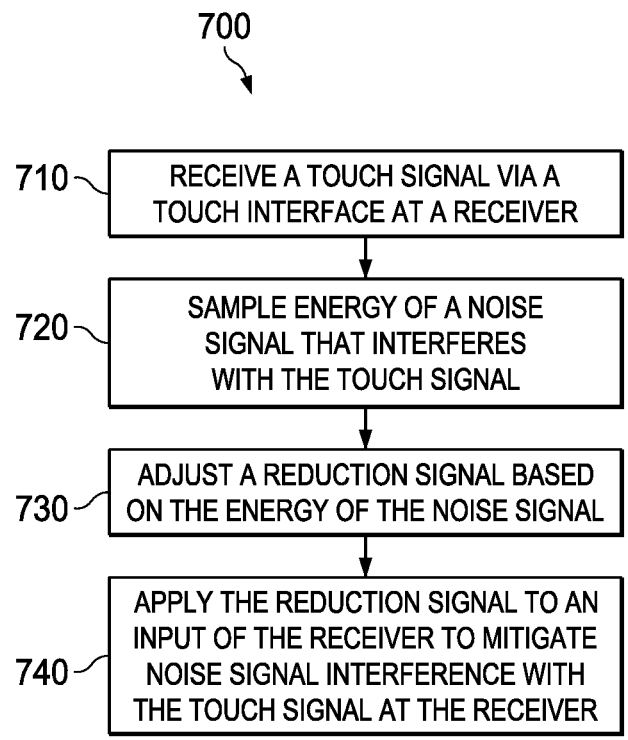
FIG. 7 is a flow diagram of an example method to mitigate noise interference for a touch system.

FIG. 7 illustrates an example method 700 to mitigate noise interference for a touch system. At 710, the method 700 includes receiving a touch signal via a touch interface at a receiver (e.g., via receiver 110 of FIG. 1). At 720, the method 700 includes sampling energy of a noise signal that interferes with the touch signal (e.g., via noise reduction circuit 124 of FIG. 1). At 730, the method 700 includes adjusting a reduction signal based on the energy of the noise signal (e.g., via control circuit 140 of FIG. 1). At 740, the method 700 includes applying the reduction signal to an input of the receiver to mitigate noise signal interference with the touch signal at the receiver (e.g., via noise reduction circuit 124 of FIG. 1). The adjusting of the reduction signal can also include at least one of the following that includes adjusting a high pass filter to isolate the noise signal in a desired frequency band. This can include adjusting a gain circuit to increase or decrease the amplitude of the noise signal. For example, the adjusting can also include adjusting a delay circuit to adjust the phase of the noise signal with respect to the touch signal.

Modifications are possible in the described embodiments, and other embodiments are possible, within the scope of the claims.

What is claimed is:

1. A system, comprising:
   a touch system;
   a control gain circuit;
   a receiver coupled to the touch system and that is configured to receive a touch signal from the touch system; and
   a noise reduction circuit coupled to the receiver and the touch system, the noise reduction circuit is configured to:
   sample the touch signal to detect a noise signal in the touch signal;
   generate a reduction signal based on the detected noise signal;
   communicate the reduction signal to the receiver to mitigate the noise signal; and
   a control circuit comprising a low pass filter coupled to an envelope detector and the envelope detector coupled to a control gain circuit to provide measurements from at least one of the touch signal and coupled to the noise reduction circuit, the control circuit configured to:
   measure the touch signal;
   measure the noise signal;
   generate an adjustment signal based on the measured noise signal; and
   communicate the adjustment signal to the noise reduction circuit.

2. The system of claim 1, wherein the receiver comprises an amplifier that amplifies the touch signal at one input of the amplifier and receives the reduction signal at another input of the amplifier to mitigate the noise interference of the noise signal with respect to the touch signal.

3. The system of claim 2, wherein the amplifier includes at least one feedback path to control the touch signal and the noise signal, the at least one feedback path includes at least one of a resistor feedback path and a capacitor feedback path.

4. The system of claim 1, wherein the noise reduction circuit includes at least one of a high pass filter to isolate the noise signal in a desired frequency band, a gain circuit coupled to the high pass filter to increase or decrease the amplitude of the noise signal, and a delay circuit coupled to the gain circuit to adjust the phase of the noise signal with respect to the touch signal.

5. The system of claim 4, wherein the noise reduction circuit adjusts at least one of the following in response to receiving the adjustment signal: the high pass filter, the gain circuit, or the delay circuit.

6. The system of claim 1, wherein the measurements control an amount of signal adjustment in the adjustment commands from the control circuit.

7. The system of claim 1, wherein the envelope detector includes a series diode to rectify the touch signal, the output from the delay circuit, and the output from the input stage.

8. The system of claim 7, wherein the series diode is coupled to at least one resistor and capacitor to provide filtering of the touch signal, the output from the delay circuit, and the output from the input stage.

9. The system of claim 1, further comprising a summing stage before the input stage to receive at least one other signal in addition to the touch signal which is applied to the input stage via the summing stage to mitigate noise interference of the noise signal with respect to the touch signal at the receiver.

10. An integrated circuit, comprising:
    a receiver that is adapted to be coupled to a touch system and configured to receive a touch signal from the touch system;
    a noise reduction circuit coupled to the receiver and configured to:
    sample the touch signal to detect a noise signal in the touch signal;
    generate a reduction signal based on the detected noise signal; and
    communicate the reduction signal to the receiver to mitigate the noise signal; and
    a control circuit comprising a low pass filter coupled to an envelope detector and the envelope detector coupled to a control gain circuit to provide measurements from at least one of the touch signal and coupled to the noise reduction circuit and the control circuit configured to:
    measure the touch signal;
    measure the noise signal;
    generate an adjustment signal based on the measured noise signal; and
    communicate the adjustment signal to the noise reduction circuit.

11. The integrated circuit of claim 10, wherein the noise reduction circuit includes at least one of a high pass filter to isolate the noise signal in a desired frequency band, a gain circuit coupled to the high pass filter to increase or decrease the amplitude of the noise signal, and a delay circuit coupled to the gain circuit to adjust the phase of the noise signal with respect to the touch signal.

12. The integrated circuit of claim 11, wherein the noise reduction circuit adjusts at least one of the following in response to receiving the adjustment signal: the high pass filter, the gain circuit, or the delay circuit.

13. The integrated circuit of claim 10, wherein the measurements control an amount of signal adjustment in the adjustment commands from the control circuit.

14. The integrated circuit of claim 13, wherein the envelope detector includes a series diode to rectify the touch signal, the output from the delay circuit, and the output from the input stage.

15. The integrated circuit of claim 10, wherein the input stage is an amplifier that amplifies the touch signal at one input of the amplifier and receives the reduction signal at another input of the amplifier to mitigate the noise interference of the noise signal with respect to the touch signal.

16. A method, comprising:
    receiving, from a touch system, a touch signal at a receiver;
    sampling, by a noise reduction circuit, the touch signal to detect a noise signal in the touch signal;
    generating, by the noise reduction circuit, a reduction signal based on the detected noise signal; and
    communicating, by the noise reduction circuit, the reduction signal the receiver to mitigate the noise signal;
    measuring, by a control circuit, the touch signal and the noise signal, the control circuit comprising a low pass filter coupled to an envelope detector and the envelope detector coupled to a control gain circuit;
    generating, by the control circuit, an adjustment signal based on the measured noise signal; and
    communicating, by the control circuit to the noise reduction circuit, the adjustment signal.

17. The method of claim 16, further comprising, in response to receiving the adjustment signal at the noise reduction circuit, adjusting at least one of:
- a high pass filter at the noise reduction circuit to isolate the noise signal in a desired frequency band;
- a gain circuit at the noise reduction circuit to increase or decrease the amplitude of the noise signal; and
- a delay circuit at the noise reduction circuit to adjust the phase of the noise signal with respect to the touch signal.

* * * * *